United States Patent
Magnus et al.

(10) Patent No.: US 11,073,198 B1
(45) Date of Patent: Jul. 27, 2021

(54) DUAL MOTOR DUAL EPICYCLICAL GEARBOX WITH COUPLED ANNULUS WITH EXTERNAL TEETH

(71) Applicant: STEERING SOLUTIONS IP HOLDING CORPORATION, Saginaw, MI (US)

(72) Inventors: Brian J. Magnus, Frankenmuth, MI (US); Niklaus A. von Matt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/859,657

(22) Filed: Apr. 27, 2020

(51) Int. Cl.
*F16H 37/06* (2006.01)
*F16H 1/46* (2006.01)
*F16H 48/05* (2012.01)
*F16H 48/10* (2012.01)

(52) U.S. Cl.
CPC .............. *F16H 37/065* (2013.01); *F16H 1/46* (2013.01)

(58) Field of Classification Search
CPC .......... F16H 37/065; F16H 1/46; F16H 48/05; F16H 48/06; F16H 2048/085; F16H 48/10
See application file for complete search history.

(56) References Cited

U.S. PATENT DOCUMENTS

| | | | | | |
|---|---|---|---|---|---|
| 2,351,219 | A | * | 6/1944 | McMullen | F16H 37/041 475/9 |
| 4,700,589 | A | * | 10/1987 | Coronel | B62D 11/10 180/6.2 |
| 4,784,017 | A | * | 11/1988 | Johnshoy | B60K 17/3465 475/5 |
| RE33,278 | E | * | 7/1990 | Johnshoy | F16H 3/72 475/5 |
| 5,572,910 | A | * | 11/1996 | Tomaselli | B64C 27/12 416/169 R |
| 5,935,038 | A | * | 8/1999 | Woytaszek | F16H 1/46 475/336 |
| 6,962,097 | B2 | * | 11/2005 | Cippitelli | B62D 11/10 74/347 |
| 7,217,213 | B2 | * | 5/2007 | Cavicchioli | F16H 37/0833 192/12 R |
| 2008/0121057 | A1 | * | 5/2008 | Janson | F16H 37/065 74/412 R |
| 2012/0160056 | A1 | * | 6/2012 | Wrong | F16H 37/065 74/665 A |
| 2015/0337937 | A1 | * | 11/2015 | Rodriguez | B60K 17/046 475/5 |
| 2020/0163274 | A1 | * | 5/2020 | Nakagawa | A01C 17/008 |

* cited by examiner

*Primary Examiner* — Tinh Dang
(74) *Attorney, Agent, or Firm* — Dickinson Wright PLLC

(57) ABSTRACT

A gear control system for controlling output torque provided to axles of a vehicle may include a first planetary gear set, a second planetary gear set, and a set of engageable locking mechanisms. Each planetary gear set may include at least a sun gear, a ring gear circumferentially disposed around the sun gear, and a carrier that is coupled to the sun gear and an axle. The set of engageable locking mechanisms may include at least one of a first engageable locking mechanism that is engageable with the first planetary gear set or a second engageable locking mechanism that is engageable with the second planetary gear set. The set of engageable locking mechanisms may be selectively configured to engage or disengage based on a trigger condition being satisfied.

20 Claims, 6 Drawing Sheets

DUAL MOTOR DUAL EPICYCLICAL GEARBOX WITH COUPLED ANNULUS WITH EXTERNAL TEETH

TECHNICAL FIELD

This disclosure relates generally to gear systems, and more particularly, to planetary gear train systems.

BACKGROUND OF THE INVENTION

A gear system (e.g., a transmission) may be used to provide controlled application of power for a vehicle. For example, a gear system may include gears and gear trains to provide speed and torque conversions from one or more rotating power sources to axles and corresponding wheels of the vehicle.

An epicyclic gear train system (also known as a planetary gear train system) includes a sun gear, a ring gear, and one or more planet gears disposed between sun and ring gears. External teeth of the sun gear mesh with the external teeth of at least one planet gear. Planet gear teeth then mesh with the internal teeth of the ring gear. The sun gear may be coupled to a motor shaft that connects to a motor. The motor may generate energy that causes the motor shaft to rotate, which causes each respective gear in the planetary gear train system to rotate. An endpoint gear or component in the planetary gear train system may connect to one or more axles. Thus, the rotation of the endpoint gear or component causes the one or more axles to rotate, which causes the wheels of the vehicle to spin.

SUMMARY OF THE INVENTION

This disclosure relates generally to detection of parameter imbalances in synchronous motor drives.

An aspect of the disclosed embodiments includes a gear system for controlling output torque provided to axles of a vehicle. The gear system may include a first planetary gear set, a second planetary gear set, and a set of engageable locking mechanisms. The first planetary gear set may include at least a first sun gear that is radially disposed about a first axis, a first ring gear circumferentially disposed around the first sun gear, and a first carrier that is coupled to the first sun gear and a first axle. The second planetary gear set may include at least a second sun gear that is radially disposed about a second axis that is offset from and parallel to the first axis, a second ring gear circumferentially disposed around the second sun gear, and a second carrier that is coupled to the second sun gear and a second axle. The set of engageable locking mechanisms may be selectively configured to engage or disengage based on a trigger condition being satisfied. The set of engageable locking mechanisms may include at least one of: a first engageable locking mechanism that is engageable with the first planetary gear set, or a second engageable locking mechanism that is engageable with the second planetary gear set.

Another aspect of the disclosed embodiments includes a method comprising receiving sensor data from sensors associated with the vehicle and determining whether one or more conditions are satisfied by comparing the sensor data and corresponding threshold data. The method further comprises selecting, based on determining whether the one or more conditions are satisfied, a lock configuration, of a set of lock configurations, for a set of engageable locking mechanisms of a gear system. The method further comprises causing, using a signal indicative of the selected lock configuration, the set of engageable locking mechanisms to be configured with the selected lock configuration.

Another aspect of the disclosed embodiments includes a gear control system for controlling output torque provided to axles of a vehicle. The gear control system may include a gear system, a processor, and a memory. The gear system may include a first planetary gear set, a second planetary gear set, and a set of engageable locking mechanisms. The first planetary gear set may include at least a first sun gear that is radially disposed about a first axis, a first ring gear circumferentially disposed around the first sun gear, and a first carrier that is coupled to the first sun gear and a first axle. The second planetary gear set may include at least a second sun gear that is radially disposed about a second axis that is offset from and parallel to the first axis, a second ring gear circumferentially disposed around the second sun gear, and a second carrier that is coupled to the second sun gear and a second axle. The set of engageable locking mechanisms may be selectively configured to engage or disengage based on a trigger condition being satisfied. The set of engageable locking mechanisms may include at least one of: a first engageable locking mechanism that is engageable with the first planetary gear set, or a second engageable locking mechanism that is engageable with the second planetary gear set. The memory may include instructions that, when executed by the processor, cause the processor to receive sensor data from sensors associated with the vehicle, determine whether one or more conditions are satisfied by comparing the sensor data and corresponding threshold data, select, based on determining whether the one or more conditions are satisfied, a lock configuration, of a set of lock configurations, for a set of engageable locking mechanisms of the gear system, and cause, using a signal indicative of the selected lock configuration, the set of engageable locking mechanisms to be configured with the selected lock configuration.

These and other aspects of the present disclosure are disclosed in the following detailed description of the embodiments, the claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
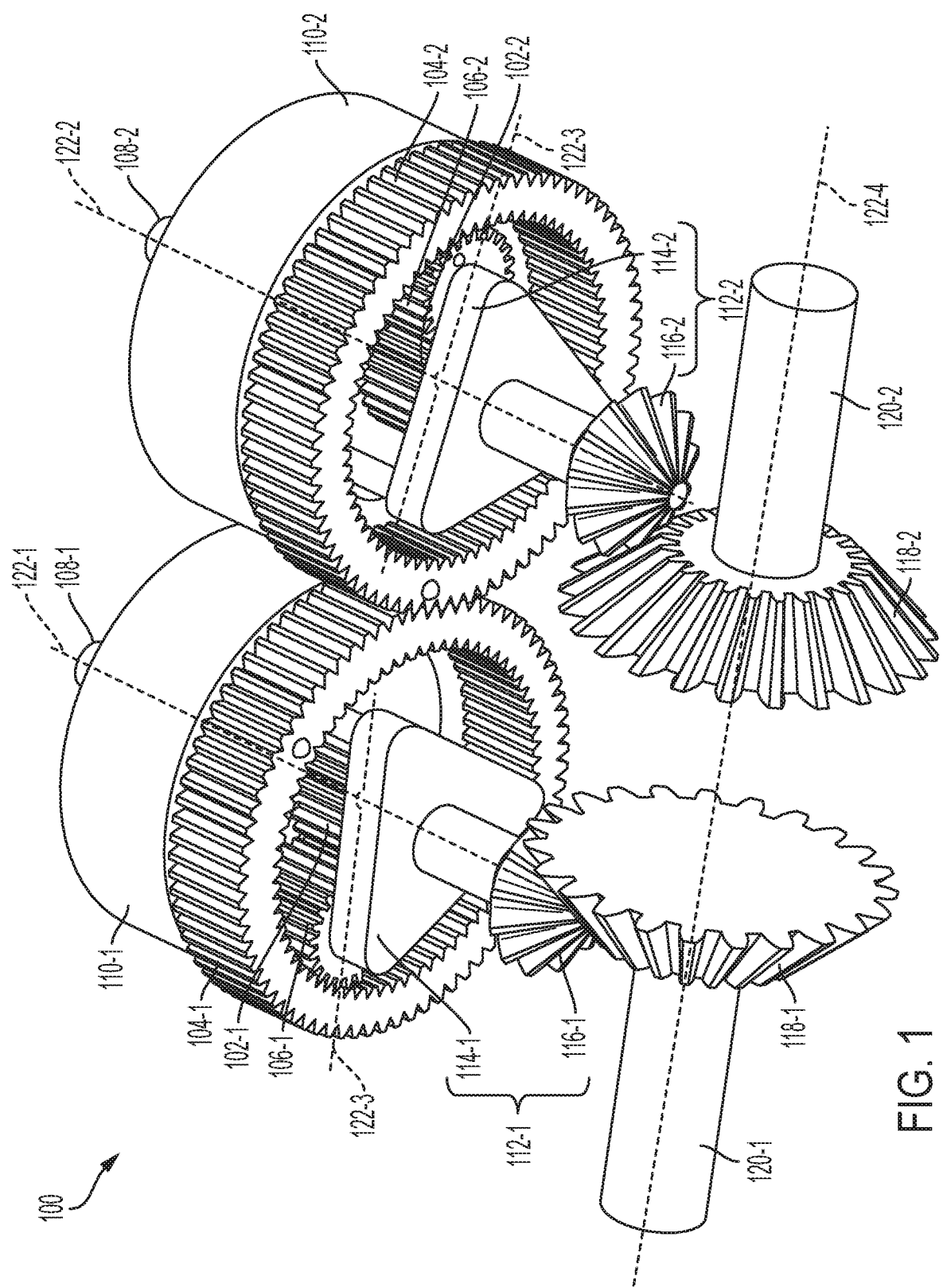
FIG. 1 generally illustrates a perspective view of a planetary gear train system, according to the principles of the present disclosure.

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a gear system (e.g., a transmission) may be used to provide controlled application of power for a vehicle. For example, a gear system may include gears and gear trains to provide speed and torque conversions from one or more rotating power sources to axles and corresponding wheels of the vehicle.

An epicyclic gear train system (also known as a planetary gear train system) includes a sun gear, a ring gear, and one or more planet gears disposed between the sun and ring gears. External teeth of the sun gear may mesh with the external teeth of at least one planet gear. Planet gear teeth then mesh with the internal teeth of the ring gear. The sun gear may be coupled to an input shaft that connects to a motor. The motor may generate energy that causes the motor shaft to rotate, which causes each respective gear in the planetary gear train system to rotate. An endpoint gear in the planetary gear train system may connect to one or more axles. Thus, the rotation of the endpoint gear causes the one or more axles to rotate, which causes the wheels of the vehicle to spin.

In a power split gear configuration, the planetary gear train system may receive input torque generated from two separate power supplies. For example, the planetary gear system may receive input torque generated from a fossil fuel motor (e.g., an internal combustion engine (ICE)), may receive input torque generated from one or more electric motors, or may receive input torque generated from both the ICE and the one or more electric motors. In each of these cases, the planetary gear train system may convert the input torque to output torque and may provide the output torque to a particular axle pair.

In some situations, the planetary gear train system may provide a different amount of output torque to each axle or wheel. In these situations, a differential may be used to perform torque vectoring to vary the output torque provided to each axle or wheel. However, without the assistance of the differential, a planetary gear train system utilizing a power split gear configuration may be capable of selectably controlling the amount of output torque applied to each axle.

Accordingly, systems and methods, such as those described herein, may be configured to selectively control the amount of output torque applied to specific axles of a vehicle. In some embodiments, the vehicle may be configured with a gear system that includes two planetary gear sets. In some embodiments, the gear system may be configured to include a set of engageable locking mechanisms. In some embodiments, the set of engageable locking mechanisms may engage or disengage based on a signal from a processor. For example, a processor may receive sensor data from sensors associated with the vehicle and may process the sensor data to determine whether one or more conditions are satisfied. If the one or more conditions are satisfied, the processor may provide a signal to an actuator component of an engageable locking mechanism. This may cause the actuator component to actuate a locking component of the engageable locking mechanism in a manner that causes the locking component to engage or disengage with a particular component of the gear system (e.g., a ring gear of a planetary gear set, a carrier of the planetary gear set, etc.).

In some embodiments, a lock configuration of the set of engageable locking mechanisms may cause the gear system to operate in torque mode. For example, a locking component of an engageable locking mechanism may engage with a ring gear of a planetary gear set. This may impact rotation of gears and shafts within the gear system such that output torque is distributed equally between axles of an axle pair.

In some embodiments, a lock configuration of the set of engageable locking mechanisms may cause the gear system to operate in high speed mode. For example, a locking component of an engagement locking mechanism may engage with a carrier of a planetary gear set. This may impact rotation of gears and shafts within the gear system such that output torque is provided entirely to one axle of an axle pair.

The systems and methods described herein provide at least the benefits of flexibly directing output torque to specific axles of the vehicle in order to maximize vehicle performance. Furthermore, by selectively switching between modes based on whether one or more conditions are satisfied, the processor optimizes performance of the gear system 100 and reduces a utilization of resources (e.g., power, fuel, computing resources of in-vehicle devices, and/or the like) relative to single-input-single-output transmission system configurations and relative to multi-input-single-output transmission system configurations.

FIG. 1 generally illustrates a perspective view of a gear system 100 (e.g., a planetary gear train system), according to the principles of the present disclosure. In some embodiments, the gear system 100 may be part of a powertrain system that is configured to control multiple types of power (e.g., fossil fuel, electric, etc.) to generate torque (referred to herein as output torque) to be applied to axles of a vehicle.

The powertrain system, as will be described further herein, may include an engine (e.g., an internal combustion engine (ICE)), one or more electric motors, and a drivetrain system that includes the gear system 100. In some embodiments, the powertrain system may include just the one or more electric motors (and not an ICE).

The vehicle may include a land vehicle (e.g., a car, a truck, a motor cycle, construction equipment, etc.), an aerial vehicle, a watercraft, and/or another type of vehicle that utilizes two or more types of power. In some embodiments, the vehicle may be an electric vehicle. In some embodiments, the vehicle may be a hybrid vehicle.

The gear system 100 may include sun gears 102 (shown as sun gear 102-1 and sun gear 102-2), ring gears 104 (shown as ring gear 104-1 and ring gear 104-2), planet gears 106 (shown as planet gear 106-1 and planet gear 106-2), input shafts 108 (shown as input shaft 108-1 and input shaft 108-2), ring gear housings 110 (shown as ring gear housing 110-1 and ring gear housing 110-2), and carriers 112 (shown as carrier 112-1 and carrier 112-2). The carriers 112 may include flanges 114 (shown as flange 114-1 and flange 114-2), and carrier gears 116 (shown as carrier gear 116-1 and carrier gear 116-2). Axles may be used to connect the gear system 100 with wheels of the vehicle. The axles may include axle gears 118 (shown as axle gear 118-1 and axle gear 118-2) and output shafts 120 (shown as output shaft 120-1 and output shaft 120-2). The axles may be part of the drivetrain system and, as will be described further herein, may connect to the gear system 100 via a mesh between the carrier gears 116 and the axle gears 118.

In some embodiments, components of the gear system 100 may be referred to as being in positions relative to a first axis 122-1. Additionally, or alternatively, components of the gear system 100 may be described in positions relative to a second axis 122-2 that is offset from, yet parallel to the first axis 122-1. Additionally, or alternatively, components of the gear system 100 may be described in positions relative to a third axis 122-3 that is perpendicular to the first axis 122-1 and to the second axis 122-2. Additionally, or alternatively, components of the gear system 100 may be described in positions relative to a fourth axis 122-4 that is perpendicular to the first axis 122-1 and to the second axis 122-2 and that is offset from the third axis 122-3.

In some embodiments, respective sun gears 102 may be surrounded by and concentric with corresponding ring gears 104. For example, the sun gear 102-1 be surrounded by and share the first axis 122-1 with ring gear 104-1 and the sun gear 102-2 may be surrounded by and share the second axis 122-2 with ring gear 104-2. The sun gears 102 and the ring gears 104 may be gears that include external teeth. In some embodiments, the ring gears 104 may be connected to the ring gear housings 110. For example, the ring gears 104 may be connected to the ring gear housings 110 via gear bearings. In the example shown, ring gear 104-1 may be connected to ring gear housing 110-1 using a first gear bearing and ring gear 104-2 may be connected to ring gear housing 110-2 using a second gear bearing.

In some embodiments, the sun gears 102 may be connected to the motors. For example, the sun gear 102-1 may be connected around a first endpoint of input shaft 108-1, where a second endpoint of input shaft 108-1 connects to a first motor. The sun gear 102-2 may be connected around a first endpoint of input shaft 108-2, where a second endpoint of input shaft 108-2 connects to a second motor. The input shafts 108 may include motor shafts, transmission shafts, crankshafts, and/or other types of shafts.

The planet gears 106 may include pinions or other types of gears. In some embodiments, the planet gears 106 may include external teeth. In some embodiments, the planet gears 106 may be disposed between and in mechanical communication with the sun gears 102 and the ring gears 104. For example, planet gear 106-1 may be disposed between and in mechanical communication with sun gear 102-1 and ring gear 104-1, and planet gear 106-2 may be disposed between and/or in mechanical communication with sun gear 102-2 and ring gear 104-2. The planet gear 106-1 may be in mechanical communication with the sun gear 102-1 by meshing the external teeth of the planet gear 106-1 with the external teeth of the sun gear 102-1. The planet gear 106-1 may be in mechanical communication with the ring gear 104-1 by meshing the external teeth of the planet gear 106-1 with the internal teeth of the ring gear 104-1. A similar configuration may be implemented to allow planet gear 106-2 to be in mechanical communication with sun gear 102-2 and ring gear 104-2.

In some embodiments, multiple planet gears 106 may be configured between sun gears 102 and ring gears 104. For example, the gear system 100 may be configured such that two planet gears 106, three planet gears 106, or more, are disposed between the sun gears 102 and the ring gears 106. As a specific example, a first planet gear 106 may be in mechanical communication with the sun gear 102-1 and a second planet gear 106, and the second planet gear 106 may be in mechanical communication with the ring gear 104-1. The second planet gears 106 may be displaced axially from the first planet gears 106. A third planet gear 106 and a fourth planet gear 106 may be configured in a similar manner (e.g., configured such that the third and fourth planet gears 106 are between sun gear 102-2 and ring gear 104-2).

In some embodiments, the planet gears 106 may be coupled to carriers 112. For example, planet gear 106-1 may be coupled to carrier 112-1 and planet gear 106-2 may be coupled to carrier 112-2. In some embodiments, the carriers 112 may include a flange 114 (e.g., shown as a triangle-shaped platform or surface) and one or more carrier gears 116 (shown with conical shaped gear heads). For example, the carrier 112-1 may include flange 114-1 and carrier gear 116-1, and the carrier 112-2 may include flange 114-2 and the carrier gear 116-2.

In some embodiments, a center of carrier 112-1 may be along the first axis 122-1 and a center of carrier 112-2 may be along the second axis 122-2. In some embodiments, respective flanges 114 may be radially disposed about a third axis 122-3 that is perpendicular to the first axis 122-1 and to the second axis 122-2. For example, a center of a flange 114-1 of carrier 112-1 and a center of flange 114-2 may be radially disposed about the third axis 122-3.

In some embodiments, the carriers 112 may further include carrier pins that connect respective flanges 114 with corresponding planet gears 106. For example, a first carrier pin may extend from the flange 114-1 through planet gear 106-1 and a second carrier pin may extend from the flange 114-2 through planet gear 106-2.

In some embodiments, the carrier gears 116 may be coupled to the flanges 114. For example, the carrier gear 116-1 may be coupled to the flange 114-1 and the carrier gear 116-2 may be coupled to the flange 114-2. The carrier gears 116 may include bevel gears, pinions, or other types of gears. In some embodiments, respective flanges 114 may include an aperture that corresponding carrier gears 116 may be placed in to connect to each flange 114. In some embodiments, respective flanges 114 and corresponding carrier gears 116 may be connected using another type of connection mechanism.

In some embodiments, the carrier gears 116 may be in mechanical communication with axle gears 118. For example, carrier gear 116-1 may be in mechanical communication with axle gear 118-1 and carrier gear 116-2 may be in mechanical communication with axle gear 118-2. In some embodiments, the carrier gears 116 may in mechanical communication with the axle gears 118 using external teeth that mesh with external teeth of the axle gears 118. For example, carrier gear 116-1 may include external teeth that mesh with corresponding external teeth of axle gear 118-1 and carrier gear 116-2 may include external teeth that mesh with corresponding external teeth of axle gear 118-2. In some embodiments, the carrier gears 116 may be bevel gears that include conical heads that allow respective carrier gears 116 to engage with corresponding axle gears 118 at a pitch angle that is 90 degrees (or near 90 degrees) of a corresponding axis (e.g., the first axis 122-1 or the first axis 122-2).

In some embodiments, axle gears 118 and output shafts 120 may be part of different axles. For example, axle gear 118-1 and output shaft 120-1 may be part of a first axle and axle gear 118-2 and output shaft 120-2 may be part of a second axle. The output shafts 120 may include wheel shafts, drive shafts, differential shafts, final drive shafts, and/or other types of shafts.

In some embodiments, the gear system 100 may further include one or more axle disconnect clutches. An axle disconnect clutch may be connected between an axle gear 118 and an output shaft 120. In some embodiments, the axle disconnect clutch may be engaged to provide a mechanical disconnect that prevents output torque from being provided to a given axle. In some embodiments, the axle disconnect clutch may be disengaged such that output torque may be provided to a given axle. In some embodiments, the axle disconnect clutch may be engaged or disengaged based on a signal from a processor (e.g., processor 420), as will be described further herein.

In some embodiments, the gear system 100 may further include a set of engageable locking mechanisms. The set of engageable locking mechanisms may include a friction brake, a pinch caliper, a brake pad, and/or the like. Additionally, or alternatively, the set of engageable locking mechanisms may include a pin, an electromagnetic actuator (e.g., a solenoid, etc.), one or more valves in a hydraulic or pneumatic circuit (e.g., a solenoid valve, a pneumatic valve, a hydraulic valve, etc.), a solenoid bolt, and/or the like.

In some embodiments, the ring gear 104-1 or the ring gear 104-2 may be locked to each other. In some embodiments, a ring gear (e.g., the ring gear 104-1 or the ring gear 104-2) may be locked to a housing that extends around the ring gear. In some embodiments, the ring gear 104-1 or the ring gear 104-2 may be locked using an engageable locking mechanism, such that both ring gears 104 are held in place and unable to rotate. An engageable locking mechanism may be engaged with the ring gear 104-1 or the ring gear 104-2 in a manner consistent with the type of locking mechanisms that have been configured. In some embodiments, a particular carrier 112 may be locked using an engageable locking mechanism, such that only the particular carrier 112 is held in place and unable to rotate. In some embodiments, another type of gear may be locked using an engageable locking mechanism. For example, one or more of the sun gears 102, one or more of the planet gears 106, one or more of the carrier gears 114, or one or more of the axle gears 116 may be locked using the engageable locking mechanism. Additional information regarding engageable locking mechanisms is provided further herein.

In some embodiments, the gear system 100 may receive input torque and may use the input torque to control the speed of the vehicle (e.g., by generating an output torque used to rotate the wheels of the vehicle). In some embodiments, the motors may generate input torque that causes the input shafts 108 to rotate. For example, the first motor may generate the input torque in a manner that causes the input shaft 108-1 to rotate about the first axis 122-1 in a first direction. As another example, the second motor may generate the input torque in a manner that causes the input shaft 108-2 to rotate about the second axis 122-2 in a second direction.

In some embodiments, the rotation of the input shafts 108 may cause the sun gears 102 to rotate. For example, the rotation of the input shaft 108-1 may cause the sun gear 102-1 to rotate in the first direction and the rotation of the input shaft 108-2 may cause the sun gear 102-2 to rotate in the second direction.

In some embodiments, the rotation of the sun gears 102 may cause the planet gears 106 to rotate. For example, the rotation of the sun gear 102-1 may cause the planet gear 106-1 to rotate and the rotation of the sun gear 102-2 may cause the planet gear 106-2 to rotate. The direction of rotation of the planet gears 106 may be opposite that of the sun gears 102. For example, if sun gear 102-1 is rotating in the first direction, the planet gear 106-1 may rotate in the second direction. If the sun gear 102-2 is rotating in the second direction, the planet gear 106-2 may rotate in the first direction.

In some embodiments, the rotation of the planet gears 106 may cause the ring gears 104 to rotate. For example, the rotation of planet gear 106-1 may cause the ring gear 104-1 to rotate and the rotation of planet gear 106-2 may cause the ring gear 104-2 to rotate. In some embodiments, a direction of rotation of the ring gears 104 may correspond to the direction of rotation of the sun gears 102. For example, if the sun gear 102-1 is rotating in the first direction then the ring gear 104-1 will rotate in the first direction. If the sun gear 102-2 is rotating in the second direction then the ring gear 104-2 will rotate in the second direction.

In some embodiments, the rotation of the sun gears 102 or the planet gears 106 may cause the carriers 112 to rotate about corresponding axes 122. For example, the rotation of the sun gear 102-1 or the planet gear 106-1 may cause the carrier 112-1 to rotate about the first axis 122-1. Additionally, the rotation of the sun gear 102-2 or the planet gear 106-2 may cause the carrier 112-2 to rotate about the second axis 122-2. In some embodiments, as will be described further herein, one of the carriers 112 may rotate about a corresponding axis 122 and the other carrier 112 may be engaged by an engageable locking mechanism, such that the other carrier 112 is locked in a stationary position and unable to rotate.

In some embodiments, components of a carrier 112 may rotate in the same direction. For example, the flange 114-1 and the carrier gear 116-1 may both rotate with the carrier 112-1 (e.g., in the first direction) and the flange 114-2 and the carrier gear 116-2 may both rotate with the carrier 112-2 (e.g., in the second direction).

In some embodiments, the rotation of the carrier gears 116 may cause the axle gears 118 to rotate. For example, respective carrier gears 116 may include a conically shaped head with external teeth capable of meshing with corresponding axle gears 118, such that the rotation of the respective carrier gears 116 causes each corresponding axle gear 118 to rotate at an angle 90 degrees from a corresponding axis 122. In this case, the conically shaped head of the carrier gear 116-1 may rotate in the first direction to cause the axle gear 118-1 to rotate in a third direction. Additionally, the conically shaped head of the carrier gear 116-2 may rotate in the second direction to cause the axle gear 118-2 to rotate in the third direction. The third direction may be perpendicular to the first direction and the second direction.

In some embodiments, the rotation of the axle gears 118 may cause the output shafts 120 to rotate. For example, the rotation of axle gear 118-1 may cause the output shaft 120-1 to rotate in the third direction and the rotation of the axle gear 118-2 may cause the output shaft 120-2 to rotate in the third direction. The third direction may be a clockwise direction or a counterclockwise direction. This may cause output torque to be provided to the wheels of the vehicle.

In some embodiments, input torque provided by the two motors may be converted to output torque that is distributed equally between one or more pairs of axles. In some embodiments, input torque provided by the two motors may be converted to output torque that is distributed unequally between respective axles of the one or more pairs of axles. In some embodiments, the input torque provided by the two motors may be converted to output torque such that all output torque is provided to a particular axle of the one or more pairs of axles.

While one or more embodiments describe the first motor as providing input torque that causes the input shaft 108-1 to rotate in the first direction, and describes the second motor as providing input torque that causes the input shaft 108-2 to rotate in the second direction, it is to be understood that this is provided by way of example. In practice, the input shaft 108-1 may receive input torque that causes a rotation in the second direction and input shaft 108-2 may receive input torque that causes a rotation in the first direction. This may cause corresponding changes in rotational direction in the other components of the gear system 100.

In some embodiments, a processor, such as a transmission controller, may select a lock configuration from a set of available lock configurations. In some embodiments, the set of available lock configurations may correspond to a set of gear configuration modes. For example, the set of gear configuration modes may include a torque mode, a high speed mode, a low speed mode, and/or another type of mode. In order for the gear system 100 to operate in a particular mode, the processor must select a lock configuration that corresponds to the particular mode. A description of example lock configurations and corresponding examples modes is provided in connection with FIGS. 2A and 2B.

In some embodiments, the processor may receive sensor data that is to be used to select a particular lock configuration. For example, the processor may receive sensor data from a set of sensors. The sensor data may include, for example, data indicating a gear that the vehicle is in, data indicating a position or rotational speed of a shaft, data indicating a degree to which a throttle is open and/or air intake of an engine or motor, data indicating a speed of a torque converter of the vehicle, data indicating a speed of the vehicle and/or a speed of a wheel of the vehicle, data indicating a temperature of fluid inside of the transmission of the vehicle, data indicating an angle of inclination of the vehicle, data indicating one or more tow conditions (e.g., data indicating a gear the vehicle is in, data indicative of a pair of wheels being lifted off the road, etc.), and/or the like.

In some embodiments, the processor may select a lock configuration based on one or more conditions being satisfied. The one or more conditions may include gear shifting conditions, system error conditions, external event-related conditions, and/or any other conditions relating to various types of vehicle sensor data. The gear shifting conditions may include a speed condition that is satisfied when a vehicle speed satisfies a threshold speed, a clutch positioning condition that is satisfied when a position of a clutch of the vehicle is changed (e.g., such as when a driver shifts a manual transmission vehicle), a power condition that is satisfied when a power level of one or more power sources satisfies a threshold power level (e.g., such as when a hybrid vehicle has low battery and has to begin providing torque to the wheels via a heat engine, rather than an electric motor), and/or the like.

The system error conditions may include a wheel spin error condition that is satisfied when a difference in a speed at which two or more wheels of the vehicle are spinning satisfies a threshold difference, an alert error condition that is satisfied when an alert is triggered by another component or system of the vehicle, and/or the like. The external event-related conditions may include weather conditions, road conditions, and/or the like. For example, the weather conditions may include a weather condition that is satisfied when weather data values collected by one or more sensors of the vehicle satisfy corresponding threshold weather data values. The road conditions may include, for example, a road condition that is satisfied when sensor data values relating to a road quality metric satisfy corresponding sensor data values.

In some embodiments, the processor may select a first lock configuration, which corresponds to the gear system 100 being in a torque mode, based on one or more conditions being satisfied. For example, under typical vehicle operating conditions, the gear system 100 may operate in torque mode, such that an equal amount of output torque is provided to each axle in an axle pair. In this case, the processor may process the sensor data to determine that one or more conditions are satisfied, where the one or more satisfied conditions correspond to typical vehicle operating conditions (torque mode). The processor may select the first lock configuration based on determining that the one or more conditions are satisfied. An additional description of the first lock configuration and torque mode is provided in connection with FIG. 2A.

Additionally, or alternatively, the processor may select a second lock configuration, which corresponds to the gear system 100 being in a high speed mode, based on one or more conditions being satisfied. For example, under atypical vehicle operating conditions, such as when the vehicle has a need for wheels attached to the same axle pair to rotate at different speeds, the gear system 100 may operate in high speed mode, such that all output torque is provided to a particular axle of an axle pair. In this case, the processor may process the sensor data to determine that one or more conditions are satisfied, where the one or more satisfied conditions correspond to atypical vehicle operating conditions (high speed mode). The processor may select the second lock configuration based on determining that the one or more conditions are satisfied. An additional description of the second lock configuration and high speed mode is provided in connection with FIG. 2B.

Additionally, or alternatively, the processor may select one or more other types of lock configurations, which correspond to the gear system 100 being in one or more other modes, based on one or more conditions being satisfied. For example, the processor may select a third lock configuration, which corresponds to the gear system 100 being in a low speed mode, based on one or more conditions being satisfied.

In some embodiments, the processor may cause the gear system 100 to be configured with the selected lock configuration. For example, the process may provide a signal indicative of the selected lock configuration to an actuator that is part of an engageable locking mechanism of the gear system 100. In this case, current from the signal allows the actuator to adjust a position of one or more other components of the engageable locking mechanism (e.g., a valve, a pin, a friction brake, etc.). When the actuator position adjustment is complete, the gear system 100 may be in the selected lock configuration.

In this way, the processor and the gear system 100 are able to flexibly direct output torque to specific axles of the vehicle in order to maximize vehicle performance. Furthermore, by selectively switching between modes based on whether one or more conditions are satisfied, the processor optimizes performance of the gear system 100 and reduces a utilization of resources (e.g., power, fuel, computing resources of in-vehicle devices, and/or the like) relative to single-input-single-output transmission system configurations and relative to multi-input-single-output transmission system configurations.

As indicated above, FIG. 1 is provided merely as an example. Other examples are possible and may differ from what was described with regard to FIG. 1. For example, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components of example implementation 100 may perform one or more functions described as being performed by another set of components of example implementation 100.

Figure 2A:
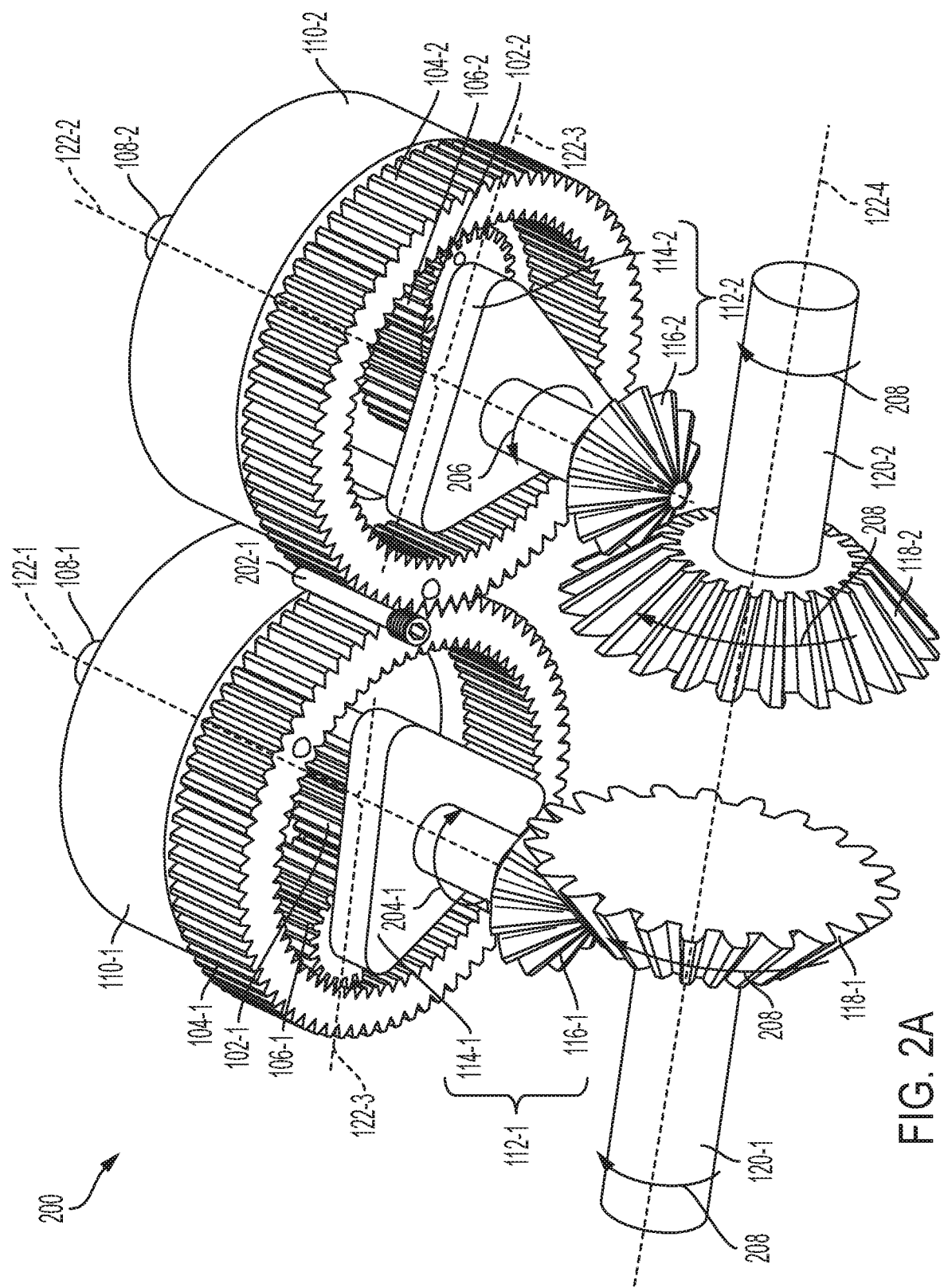
FIG. 2A generally illustrates a gear configuration of the planetary gear train system in torque mode, according to the principles of the present disclosure.

FIG. 2A generally illustrates an example configuration 200 of the gear system 100 in torque mode, according to the principles of the present disclosure. Example configuration 200 may depict the gear system 100 in torque mode, whereby the gear system 100 receives input torque generated from each respective motor and generates output torque to be distributed equally to axles of an axle pair of the vehicle.

In some embodiments, such as when the gear system 100 is in torque mode, one or more of the ring gears 104 may be locked using one or more engageable locking mechanisms. In the example shown, the ring gear 104-1 may be locked using engageable locking mechanism 202-1. The engageable locking mechanism 202-1 may include a pin and may be used to hold the ring gear 104-1 in place, such that the ring gear 104-1 is unable to rotate. Because the external teeth of the ring gear 104-1 are meshed with the external teeth of the ring gear 104-2, the ring gear 104-2 will also be held in place and unable to rotate. The pin may be engaged by an actuator that has received a signal from the processor. While the pin shown is depicted as rested between external teeth of ring gears 104, and is not shown as being connected to other components in the gear system 100, it is to be understood that this is provided for ease of illustration, and that in practice, the engageable locking mechanism 202-1 may include any combination of a pin, a brake band, an actuator (e.g., an electromagnetic (e.g., a solenoid, etc.), one or more valves (e.g., a solenoid valve, a pneumatic valve, a hydraulic valve, etc.), a solenoid bolt, etc.), and/or another type of locking mechanism.

In some embodiments, another type of gear may be locked using the one or more engageable locking mechanisms. For example, one or more of the sun gears 102, one or more of the planet gears 106, one or more of the carrier gears 116, or one or more of the axle gears 118 may be locked using the engageable locking mechanism 202-1.

In some embodiments, one or more axle disconnect clutches (e.g., which be disposed between axle gears 118 and axle shafts 120) may be engaged. For example, an axle disconnect clutch may be engaged in order to ensure that the wheels of an axle pair rotate at the same speed. In some embodiments, the one or more axle disconnect clutches may be disengaged (e.g., when there is a need for respective wheels of the axle pair to rotate at different speeds). The axle disconnect clutch may be engaged or disengaged based on a signal of the processor. For example, the processor may provide a signal to an actuator, such as a solenoid valve (e.g., with two or more positions) to cause the actuator to actuate a shift fork assembly (e.g., with tongs corresponding to various drive modes, clutch engagement states, etc.) in a manner that causes the axle disconnect clutch to engage or disengage.

In some embodiments, input torque generated and provided by the motors may cause input shafts 108 to rotate. For example, the input torque generated by a first motor may cause input shaft 108-1 to rotate in a first direction 204 and a second motor may cause input shaft 108-2 to rotate in a second direction 206. This may cause the sun gears 102 and the planet gears 106 to rotate. For example, a rotation of input shaft 108-1 may cause sun gear 102-1 to rotate in the first direction 204 and a rotation of input shaft 108-2 may cause sun gear 102-2 to rotate in the second direction 206. This will cause the planet gear 106-1 to rotate in the second direction 206 and cause the planet gear 106-2 to rotate in the first direction 204.

In some embodiments, the engageable locking mechanism 202-1 may prevent the ring gears 104 from rotating. In some embodiments, the rotation of the sun gears 102 or the planet gears 106 may cause the carriers 112 to begin rotating. For example, the rotation of the sun gear 102-1 may cause the carrier 112-1 to begin rotating in the first direction 204 and the rotation of the sun gear 102-2 may cause the carrier 112-2 to begin rotating in the second direction 206. This may cause the carrier gear 116-1 to begin rotating in the first direction 204 and the carrier gear 116-2 to begin rotating in the second direction 206.

In some embodiments, the rotation of the carrier gears 116 may cause the axle gears 118 and the output shafts 120 to begin rotating. For example, the rotation of carrier gear 116-1 may cause axle gear 118-1 and output shaft 120-1 to rotate along the fourth axis 122-4 in a third direction 208, and the rotation of carrier gear 116-2 may cause axle gear 118-2 and output shaft 120-2 to rotate along the fourth axis 122-4 in the third direction 208. The rotation of the output shafts 120 may cause the wheels of the vehicle to begin rotating, thereby putting the vehicle in motion.

In this way, input torque generated from both motors may cause rotation of components within the gear system 100, where the selected lock configuration corresponding to torque mode causes output torque to be distributed equally to axles in an axle pair.

Figure 2B:
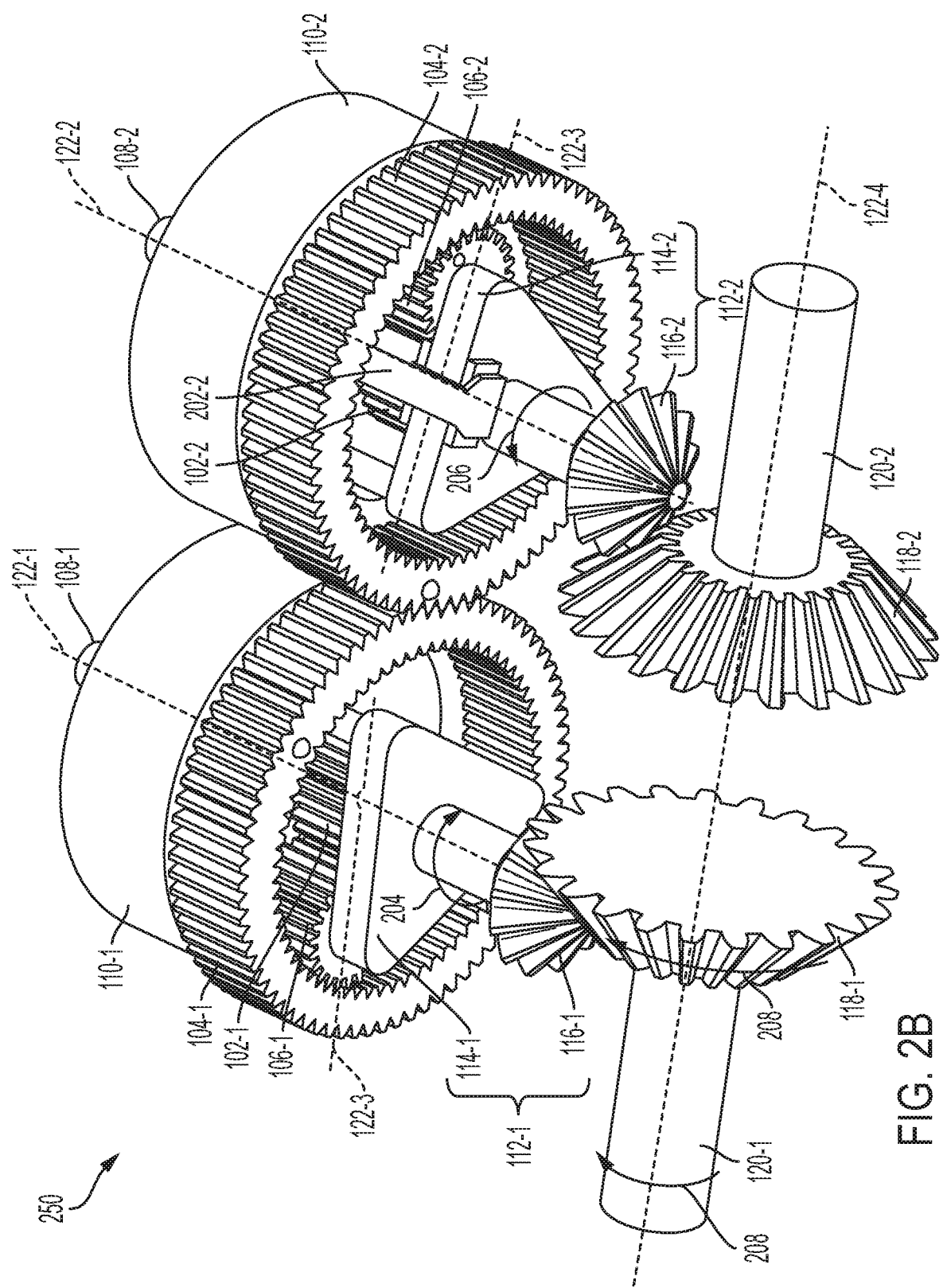
FIG. 2B generally illustrates the gear configuration of the planetary gear train system in high speed mode, according to the principles of the present disclosure.

FIG. 2B generally illustrates an example configuration 250 of the gear system 100 in high speed mode, according to the principles of the present disclosure. Example configuration 250 may depict the gear system 100 in high speed mode, whereby the gear system 100 may receive input torque from each respective motor and may generate and provide output torque to a particular axle in an axle pair.

In some embodiments, such as when the gear system 100 is in high speed mode, a carrier 112 may be locked using the one or more engageable locking mechanisms. In the example shown, the carrier 112-2 may be locked using engageable locking mechanism 202-2. The engageable locking mechanism 202-2 may include an actuator, a friction brake, a pinch caliper, a brake pad, and/or another type of locking mechanism. The engageable locking mechanism 202-2 may hold the carrier 212-2 in place such that the carrier 212-2 is unable to rotate. To provide another example, the gear system 100 may be configured in a manner that allows engageable locking mechanism 202-2 to lock the carrier 112-1 in place, such that the carrier 112-1 is unable to rotate.

In this way, the gear system 100 reduces a quantity of mechanical components that are part of the gear system 100 (e.g., relative to configuring a gear system with duplicate locking mechanisms on each respective carrier 112). Furthermore, the processor conserves resources (e.g., processing resources, computing resources, memory resources, etc.) that would otherwise be expended to generate and transmit signals needed to configure engageable locking mechanisms on each respective carrier.

While the friction brake shown is depicted on one of the sides of the flange 114-2, and is not shown as being connected to other components in the gear system 100, it is to be understood that this is provided for ease of illustration, and that in practice, the engageable locking mechanism 202-2 may include any combination of an actuator, a friction brake, a brake pad, a pinch caliper, and/or another type of locking mechanism.

In some embodiments, an axle disconnect clutch may be disengaged. For example, the processor may send a signal to an actuator to cause the axle disconnect clutch to disengage in order to allow an unequal amount of output torque to be provided to the wheels of the vehicle. In this way, the lock configuration of the gear system 100 allows an axle of an axle pair to be locked without the use of an additional gearbox or differential mechanism.

In some embodiments, input torque generated and provided by the motors may cause the input shafts 108 to rotate. For example, the input torque generated by a first motor may cause input shaft 108-1 to rotate in a first direction 204 and a second motor may cause input shaft 108-2 to rotate in a second direction 206. This may cause the sun gears 102 and the planet gears 106 to rotate. For example, a rotation of input shaft 108-1 may cause sun gear 102-1 to rotate in the first direction 204 and a rotation of input shaft 108-2 may cause sun gear 102-2 to rotate in the second direction 206. This will cause the planet gear 106-1 to rotate in the second direction 206 and cause the planet gear 106-2 to rotate in the first direction 204.

In some embodiments, the rotation of the planet gears 106 may cause the ring gears 104 to rotate. For example, the rotation of planet gear 106-1 may cause the ring gear 104-1 to begin rotating in the first direction 204 and the rotation of planet gear 106-2 may cause the ring gear 104-2 to begin rotating in the second direction 206. Furthermore, the rotation of the sun gear 102-1, the ring gear 104-1, and/or the planet gear 106-1, may cause the carrier 112-1 (and the carrier gear 116-1) to rotate in the first direction 204. However, because the engageable locking mechanism has been engaged, the engageable locking mechanism will prevent the carrier 112-2 and the carrier gear 116-2 from rotating.

In some embodiments, the rotation of the carrier gear 116-1 may cause the axle gear 118-1 and the output shaft 120-1 to begin rotating. For example, the rotation of the carrier gear 116-1 may cause the axle gear 118-1 to rotate in the third direction 208, which may cause the output shaft 120-1 to rotate in the third direction 208. Because the carrier 112-2 and the carrier gear 116-2 are prevented from rotating, axle gear 118-2 is prevented from rotating. Consequently, torque generated from both motors is converted to output torque that is provided only to output shaft 120-1. Furthermore, the output shaft 120-2 may be decoupled from the axle gear 118-2 such that output shaft 120-2 is able to freely rotate. This allows freewheeling of a wheel corresponding to the output shaft 120-2 in situations where the carrier 112-2 is locked. In some embodiments, the engageable locking mechanism 202-2 may be configured to lock the carrier 112-1. This may allow torque generated from both motors to be converted to output torque that is provided to output shaft 120-2. Furthermore, the output shaft 120-1 may be decoupled from the axle gear 118-1 such that output shaft 120-1 is able to freely rotate. This allows freewheeling of a wheel corresponding to the output shaft 120-1 in situations where the carrier 112-1 is locked. This may, for example, be useful in situations where one wheel of the vehicle is stuck in a ditch, where the back wheels or front wheels of the vehicle are stuck, and/or in any other situation where the vehicle may benefit from same-axle-pair wheels rotating at different speeds.

Figure 3:
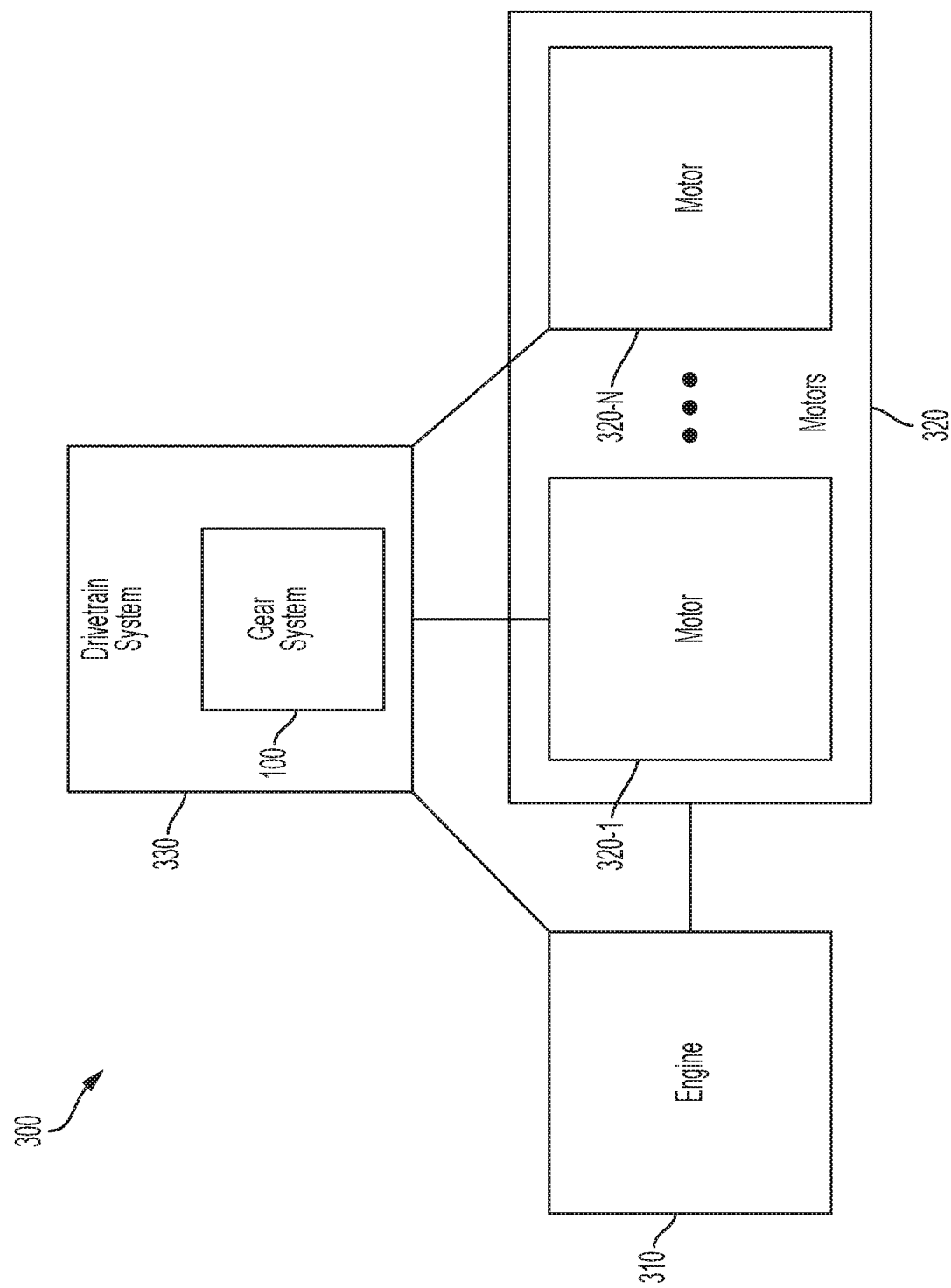
FIG. 3 generally illustrates a powertrain system, according to the principles of the present disclosure.

FIG. 3 generally illustrates an example powertrain system 300, according to the principles of the present disclosure. The example powertrain system 300 may include an engine 310, a group of motors 320 (shown to include motor 320-1 through motor 320-N), and a drivetrain system 330 (e.g., which includes the gear system 100). In some embodiments, the powertrain system 300 may be part of vehicle. The vehicle may be a vehicle, such as a hybrid vehicle, electric construction equipment (e.g., an electric fork truck, etc.), and/or another type of vehicle that utilizes two or more types of power.

The engine 310 includes one or more components capable of converting one form of energy into torque. For example, the engine 310 may include a heat engine (e.g., a gas engine, such as an internal combustion engine (ICE)), a diesel engine, and/or another type of engine. In some embodiments, such as when the vehicle is a parallel hybrid vehicle, the engine 310 may be connected in parallel (e.g., at an axis) to the gear system 100. In this case, the vehicle may be connected to the gear system 100 using an input shaft. This allows the engine 310 to provide torque to the gear system 100. In some embodiments, such as when the vehicle is a series hybrid vehicle, the engine 310 will not be mechanically connected to the wheels. In this case, the engine 310 may turn a generator to cause torque to be provided to the gear system 100 via the group of motors 320. In some embodiments, such as when the engine 310 is part of a power-split or series-parallel hybrid vehicle, the engine 310 may have mechanical or electrical connections to the gear system 100.

The group of motors 320 includes one or more components capable of converting electrical energy into torque. In some embodiments, the group of motors 320 may be electric motors. In some embodiments, the group of motors 320 may receive electrical energy from a battery and may convert the electrical energy to torque. Additionally, or alternatively, the group of motors 320 may receive torque from the engine 310 or from a corresponding generator. In some embodiments, one or more of the group of motors 320 may provide torque to the drivetrain system 330. In some embodiments, the group of motors may include two or more motors.

The drivetrain system 330 includes one or more components capable of receiving input torque and providing output torque to wheels of the vehicle. For example, the drivetrain system 330 may include the gear system 100, output shafts (e.g., front output shafts, rear output shafts, etc.), a clutch, a propeller shaft, a differential (or final drive), and/or any other mechanical component needed to provide power to the wheels of the vehicle. In some embodiments, the drivetrain system 330 may not include the differential (or the final drive) because of the configuration of gear system 100.

As described herein, the gear system 100 may include a first planetary gear set, a second planetary gear set, and a set of engageable locking mechanisms. The first planetary gear set may include a first sun gear that is in mechanical communication with a first input shaft of a first motor. The first sun gear may be radially disposed about a first axis. The first planetary gear set may further include a first ring gear that is circumferentially disposed about the first sun gear and a first set of one or more planet gears that is disposed between the first sun gear and the first ring gear. The first planetary gear set may further include a first carrier that is coupled to the first set of one or more planet gears. The first carrier may include at least a first flange radially disposed about along a third axis that is perpendicular to the first axis and the second axis, and a first carrier gear that connects to the first flange and that includes a first head in mechanical communication with a first axle.

The second planetary gear set may include a second sun gear that is in mechanical communication with a second input shaft of a second motor. The second sun gear may be radially disposed about a second axis that is offset from and parallel to the first axis. The second planetary gear set may further include a second ring gear that is circumferentially disposed about the second sun gear and a second set of one or more planet gears that is disposed between the second sun gear and the second ring gear. The second planetary gear set may further include a second carrier that is coupled to the second set of one or more planet gears. The second carrier may include at least a second flange radially disposed about the third axis and the second axis, and a second carrier gear that connects to the second flange and that includes a second head in mechanical communication with a second axle.

In some embodiments, the set of engageable locking mechanisms may include at least one of: a first engageable locking mechanism that is engageable with the first ring gear or the second ring gear, or a second engageable locking mechanism that is engageable with the first carrier or the second carrier. In some embodiments, the set of engageable locking mechanisms may include one or more other locking mechanisms engageable with other components of the gear system 100. In some embodiments, the set of engageable locking mechanisms may be selectively configured to engage or disengage based on a signal of a processor (e.g., processor 420).

In some embodiments, the gear system 100 of the drivetrain system 330 may receive input torque from each of the group of motors 320. In some embodiments, the gear system 100 of the drivetrain system 330 may receive input torque from a subset of the group of motors 320. Additionally, or alternatively, the gear system 100 of the drivetrain system 330 may receive input torque from engine 310. In some embodiments, the gear system 100 of the drivetrain system 320 may provide output torque to one or more wheels of the vehicle (e.g., via one or more axles).

In some embodiments, the configuration of gear system 100 may be based on a number of motors in the group of motors 320. For example, if the group of motors 320 includes two motors, the gear system 100 will include two sun gears 102, two ring gears 104, two groups of planet gears 206, etc. If the group of motors 320 includes three motors, the gear system 100 will include three sun gears 102, three ring gears 104, three groups of planet gears 206, etc. Additionally, or alternatively, the configuration of gear system 100 may be based on a processor determining whether one or more conditions are satisfied, as described elsewhere herein.

In some embodiments, the powertrain system 300 may be used as part of a parallel hybrid vehicle. For example, the powertrain system 300 may include an engine (e.g., an ICE, etc.), a generator, a battery, and two electric motors, where the engine and the two motors are connected in parallel (e.g., at an axis) to the drivetrain system 330 (e.g., via input shafts 108 of the gear system 100). In this case, the powertrain system 300 may be configured such that the parallel hybrid vehicle can alternate between using power from a first power source (e.g., the engine and generator), using power from a second power source (e.g., the battery and two electric motors), or using power from both the first power source and the second power source.

In some embodiments, the powertrain system 300 may be used as part of a series hybrid vehicle. For example, the powertrain system 300 may include an engine (e.g., an ICE), a generator, a battery, and two electric motors, where the engine connects to the generator, which connects to each electric motor (e.g., via a charger, a converter, etc.), where the battery connects to each electric motor, and where each electric motor connects to the drivetrain system 320 (e.g., via input shafts 108 of the gear system 100). In this case, powertrain system 300 may be configured such that the series hybrid vehicle can utilize power from a first power source (e.g., the battery and two electric motors) or may utilize power from a second power source (e.g., the engine and genitor). In some embodiments, the series hybrid vehicle may utilize power from the first power source until the battery has low power, in which case the series hybrid vehicle may utilize power from the second power source.

In some embodiments, the powertrain system 300 may be used as part of a series-parallel hybrid vehicle. In this case, the powertrain system 300 may be configured such that the series-parallel hybrid vehicle can utilize power from select power sources, depending on the mode in which the gear system 100 is operating in. The mode may also effectively determine a location of output torque and/or an amount of output torque that is provided.

Figure 4:
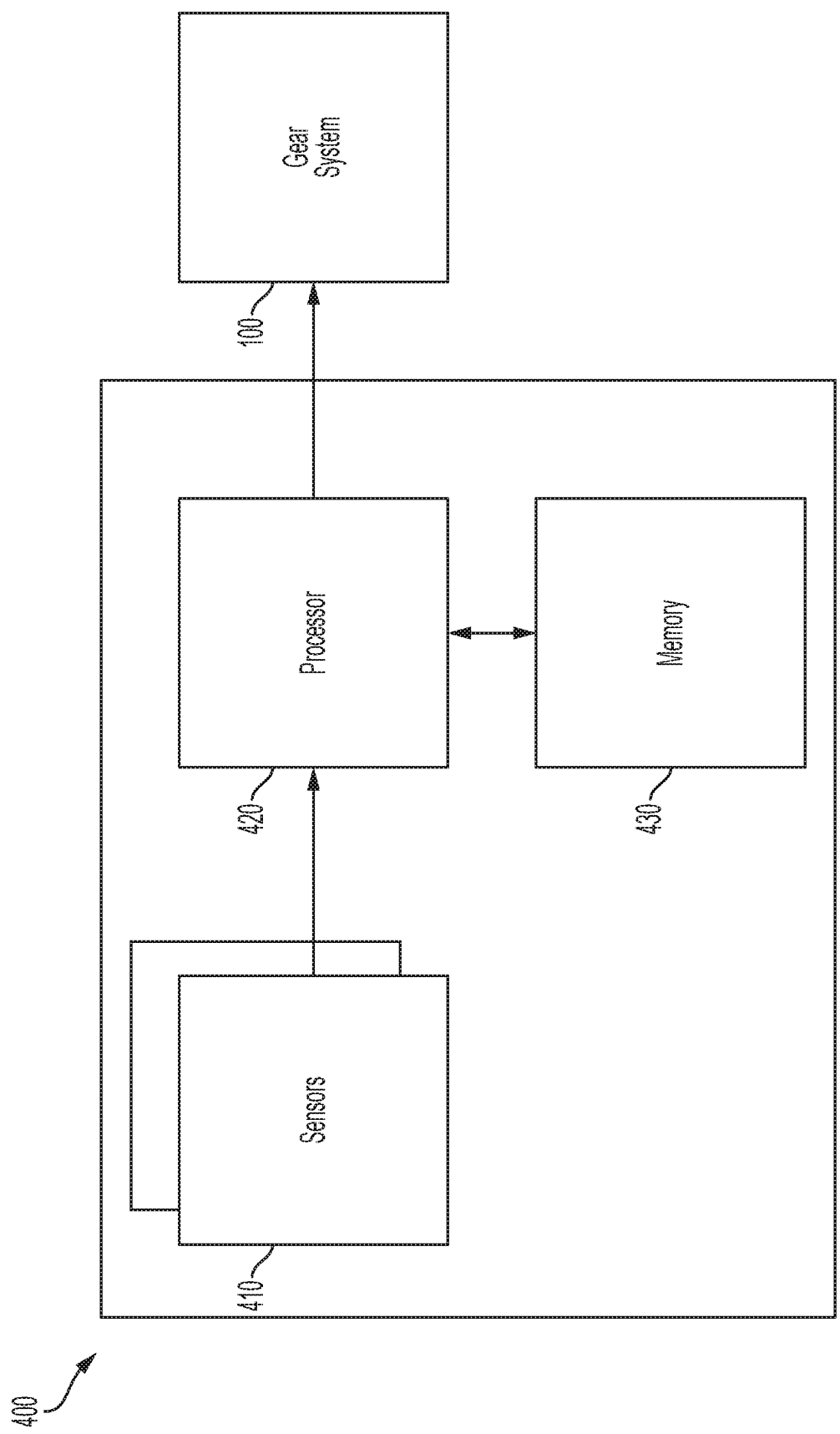
FIG. 4 generally illustrates a gear control system, according to the principles of the present disclosure.

FIG. 4 generally illustrates an example gear control system 400, according to the principles of the present disclosure. The example gear control system 400 may include a sensor 410, a processor 420 for controlling a lock configuration of gear system 100, and a memory 430. In some embodiments, a vehicle, such as a vehicle (e.g., a hybrid vehicle) may include the powertrain system 300 and the gear control system 400. In some embodiments, the gear control system 400 may be part of the powertrain system 300.

Sensors 410 include sensors capable of monitoring, detecting, measuring, generating, and/or providing sensor data. For example, sensors 410 may include position sensors, speed sensors, temperature sensors, external conditions sensors, and/or the like. The position sensors may include a gear position sensor, a shaft position sensor, a throttle position sensor, a turbine position sensor, a brake position sensor, and/or the like. The speed sensors may include a vehicle speed sensor, a wheel speed sensor, and/or the like. The temperature sensors may include a transmission fluid temperature sensor and/or other sensors capable of measuring temperature relating to a powertrain system of the vehicle. A temperature sensor may include a thermistor, a thermocouple, a resistance temperature detector (RTD), an infrared device, and/or the like. The external conditions sensors may include a traction control sensor and/or other sensors capable of monitoring, detecting, or measuring conditions external to the vehicle.

In some embodiments, one or more sensors 410 may be configured to monitor, detect, or measure sensor data. For example, the gear position sensor may detect a gear that the vehicle is in or may measure a position or relative position associated with a particular gear. As another example, the shaft position sensor may detect a position or rotational speed of a shaft (e.g., an input shaft, an output shaft, etc.). As another example, the throttle position sensor may measure air intake of an engine or motor, may measure a degree to which a throttle is open (which is indicative of engine load), and/or the like. As another example, the turbine position sensor may measure a speed of a torque converter of the vehicle. As another example, the brake position sensor may measure a position of a brake pedal of the vehicle.

As another example, the vehicle speed sensor may measure a speed of the vehicle. As another example, the vehicle wheel speed sensor may measure a speed of a wheel of the vehicle. As another example, the transmission fluid temperature sensor may measure a temperature of fluid inside the transmission of the vehicle. As another example, the traction control sensor may detect or measure inclement weather, conditions caused by inclement weather (e.g., poor traction), and/or the like.

In some embodiments, the sensors 410 may be configured to provide the sensor data to processor 420. In some embodiments, the sensors 410 may be configured to periodically provide the sensor data to processor 420 (e.g., periodically over a time period, based on a condition being satisfied, etc.). In some embodiments, the sensors 410 may provide the sensor data to the processor 420 via a bus, a communication interface, and/or the like. The communication interface may include an optical interface, a coaxial interface, a radio frequency (RF) interface, an Ethernet interface, a universal serial bus (USB) interface, a network interface, and/or the like.

Processor 420 includes a powertrain control unit (PCU), an engine control unit (ECU), a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some embodiments, processor 420 includes one or more processors capable of being programmed to perform a function.

In some embodiments, processor 420 may receive the sensor data from the sensors 410. In some embodiments, processor 420 may select, based on the sensor, a lock configuration of a set of lock configurations for a set of engageable locking mechanisms of the gear system, as described elsewhere herein. In some embodiments, processor 420 may cause the set of engageable locking mechanisms to be configured with the selected lock configuration. For example, processor 420 may provide a signal indicative of the selected lock configuration to one or more actuators of the gear system 100 to cause the one or more actuators to actuate one or more engageable locking mechanisms (e.g., such that respective engageable locking mechanisms engage or disengage with a target component of the gear system 100).

Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Figure 5:
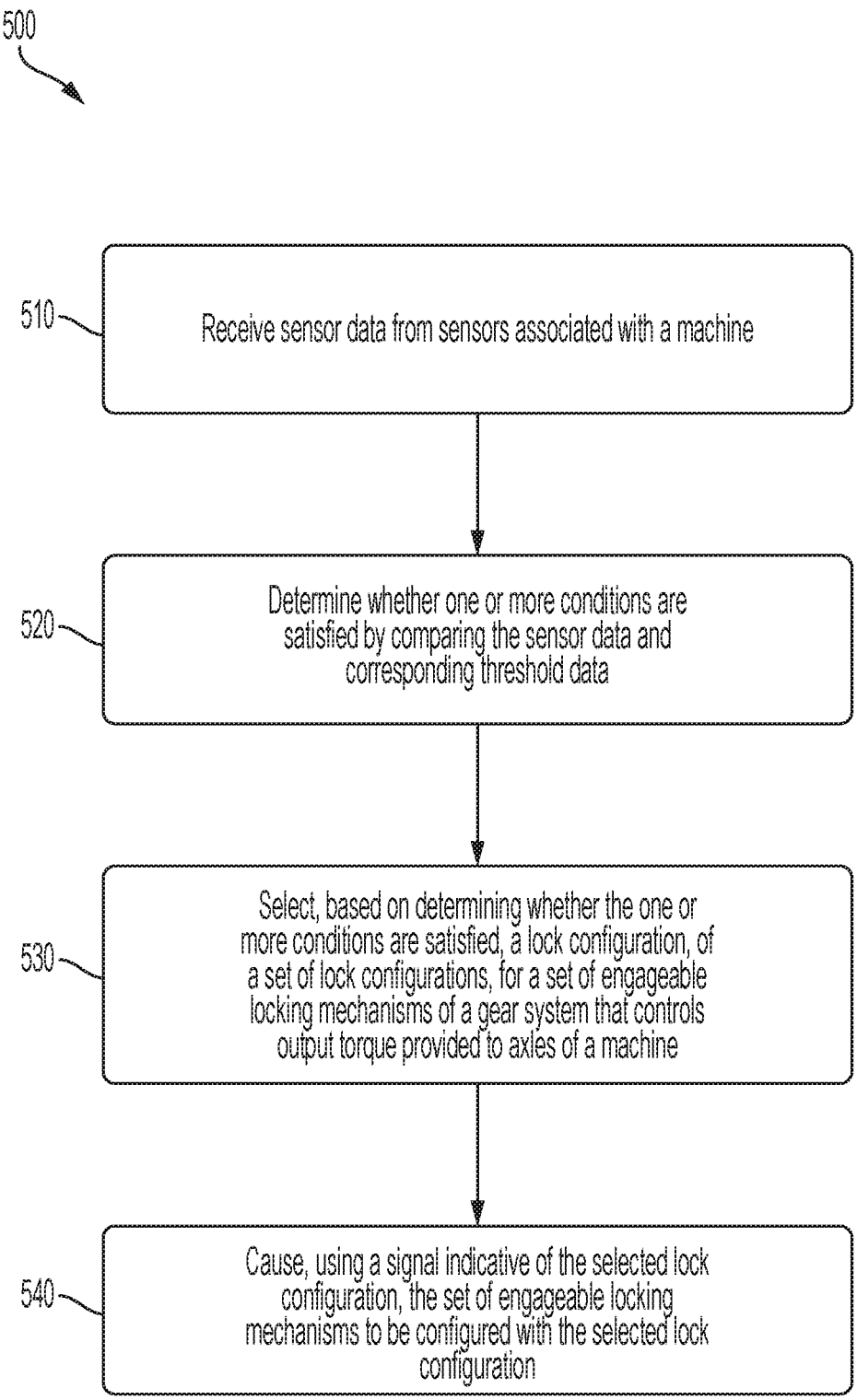
FIG. 5 is a flow diagram generally illustrating a method for controlling output torque provided to axles of a vehicle, according to the principles of the present disclosure.

FIG. 5 is a flow diagram generally illustrating a method 500, according to the principles of the present disclosure. For example, the method 500 may be performed by a processor (e.g., processor 420) of a gear control system (e.g., the gear control system 400). The processor may perform the steps of the method 500 to cause the gear system to control output torque provided to axles of a vehicle.

At 502, the method 500 receives sensor data from sensors associated with the vehicle. For example, the processor (e.g., processor 420) may receive sensor data from sensors (e.g., sensors 410) associated with the vehicle, as described herein.

At 504, method 500 determines whether one or more conditions are satisfied by comparing the sensor data and corresponding threshold data. For example, the processor may determine whether one or more conditions are satisfied by comparing the sensor data and corresponding threshold data, as described herein.

At 506, the method 500 selects, based on determining whether the one or more conditions are satisfied, a lock configuration, of a set of lock configurations, for a set of engageable locking mechanisms of the gear system. For example, the processor may select, based on determining whether the one or more conditions are satisfied, a lock configuration, of a set of lock configurations, for a set of engageable locking mechanisms of the gear system, as described herein. The set of engageable locking mechanisms may include at least one of a first engageable locking mechanism that is engageable with a particular ring gear of the gear system or a second engageable locking mechanism that is engageable with a particular carrier of the gear system.

At 508, the method 500 causes, using a signal indicative of the selected lock configuration, the set of engageable locking mechanisms to be configured with the selected lock configuration. For example, the processor may cause, using a signal indicative of the selected lock configuration, the set of engageable locking mechanisms to be configured with the selected lock configuration, as described herein.

In some embodiments, when causing the set of engageable locking mechanisms to be configured with the selected lock configuration, the processor may provide a signal to an actuator component of an engageable locking mechanism (e.g., the first engageable locking mechanism, the second engageable locking mechanism, etc.) to cause the actuator component to actuate a locking component of the engageable locking mechanism in a manner that engages the locking component with a particular ring gear of the gear system.

In some embodiments, the engageable locking mechanism may be engaged at a first time. In this case, the processor may receive new sensor and may determine whether the one or more conditions are satisfied based on the new sensor data. The processor may then provide a second signal to the actuator component to cause the actuator component to actuate the locking component of the engageable locking mechanism in a manner that disengages the locking component with the particular ring gear at a second time. The processor may then provide a third signal to another actuator component of another engageable locking mechanism to cause the other actuator component to actuate another locking component of the other engageable locking mechanism in a manner that engages the other locking component with a particular carrier of the gear system.

In some embodiments, when causing the set of engageable locking mechanisms to be configured with the selected lock configuration, the processor may provide a signal to an actuator component of the engageable locking mechanism to cause the actuator component to actuate a locking component of the engageable locking mechanism in a manner that engages the locking component with a particular carrier of the gear system.

In some embodiments, the engageable locking mechanism may be engaged at a first time. In this case, the processor may receive new sensor and may determine whether the one or more conditions are satisfied based on the new sensor data. The processor may then provide a second signal to the actuator component to cause the actuator component to actuate the locking component of the engageable locking mechanism in a manner that disengages the locking component with the particular carrier at a second time. The processor may then provide a third signal to another actuator component of another engageable locking mechanism to cause the other actuator component to actuate another locking component of the other engageable locking mechanism in a manner that engages the other locking component with a particular ring gear of the gear system.

While one or more embodiments described herein refer to an engageable locking mechanism as being engaged based on a signal from a processor, it is to be understood that this is provided by way of example, and that the engageable locking mechanism may be engaged in one or more other ways. For example, the engageable locking mechanism may be engaged based on a trigger condition being satisfied. The trigger condition may include receiving a signal from the processor, a manual implementation configured by a user, and/or any other trigger condition used to cause the actuator component to actuate the engageable locking mechanism.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such. Some implementations are described herein in connection with thresholds.

Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A gear system for controlling output torque provided to axles of a vehicle, the gear system comprising:
   a first planetary gear set comprising at least a first sun gear that is radially disposed about a first axis, a first ring gear circumferentially disposed around the first sun gear, and a first carrier that is coupled to the first sun gear and a first axle;
   a second planetary gear set comprising at least a second sun gear that is radially disposed about a second axis that is offset from and parallel to the first axis, a second ring gear circumferentially disposed around the second sun gear, and a second carrier that is coupled to the second sun gear and a second axle; and
   a set of engageable locking mechanisms that are selectively configured to engage or disengage based on a trigger condition being satisfied, the set of engageable locking mechanisms including at least one of: a first engageable locking mechanism that is engageable with the first planetary gear set, or a second engageable locking mechanism that is engageable with the second planetary gear set.

2. The gear system of claim 1, wherein trigger condition being satisfied causes an engageable locking mechanism corresponding to a particular planetary gear set to engage with a ring gear of the particular planetary gear set to prevent ring gear rotation in a manner that allows the output torque of the gear system to be distributed between the first axle and the second axle.

3. The gear system of claim 2, wherein the engageable locking mechanism corresponding to the particular planetary gear set is engaged at a first time; wherein another trigger condition being satisfied causes the engageable locking mechanism to disengage with the ring gear of the corresponding planetary gear set at a second time to allow ring gear rotation, and wherein the other signal further causes another engageable locking mechanism, that corresponds to another planetary gear set that is different than the particular planetary gear set, to engage with a carrier of the other planetary gear set to prevent carrier rotation in a manner that allows the output torque of the gear system to be provided to a particular axle that is not connected to the carrier to which the other engageable locking mechanism is engaged.

4. The gear system of claim 1, wherein the trigger condition being satisfied causes an engageable locking mechanism corresponding to a particular planetary gear set to engage with a carrier of the particular planetary gear set to prevent carrier rotation in a manner that allows the output torque of the gear system to be provided to a particular axle that is not connected to the carrier to which the engageable locking mechanism has engaged.

5. The gear system of claim 4, wherein the engageable locking mechanism is engaged at a first time, wherein another trigger condition being satisfied causes the engageable locking mechanism to disengage with the carrier at a second time to allow carrier rotation, and wherein the other signal further causes another engageable locking mechanism, that corresponds to a different planetary gear set than the particular planetary gear set, to engage with a ring gear of the other planetary gear set to prevent ring gear rotation in a manner that allows the output torque of the gear system to be distributed between the first axle and the second axle.

6. The gear system of claim 1, wherein the set of locking mechanisms include at least one of a friction break or a pin.

7. The gear system of claim 1, wherein the first carrier and the second carrier each include one or more respective carrier gears with heads that are conically shaped and include external teeth, and wherein the external teeth are engaged with corresponding external teeth of one or more respective axle gears at an angle that is within a threshold quantity of degrees of a ninety degree angle.

8. A method, comprising:
 receiving sensor data from sensors associated with a vehicle;
 determining whether one or more conditions are satisfied based on the sensor data;
 selecting, based on determining whether the one or more conditions are satisfied, a lock configuration, of a set of lock configurations, for a set of engageable locking mechanisms of a gear system that controls output torque provided to axles of the vehicle; and
 causing, using a signal indicative of the selected lock configuration, the set of engageable locking mechanisms to be configured with the selected lock configuration.

9. The method of claim 8, wherein the set of engageable locking mechanisms include at least one of:
 a first engageable locking mechanism that is engageable with a particular ring gear of the gear system, or
 a second engageable locking mechanism that is engageable with a particular carrier of the gear system.

10. The method of claim 8, wherein causing the set of engageable locking mechanisms to be configured with the selected lock configuration comprises:
 providing a signal to an actuator component of an engageable locking mechanism to cause the actuator component to actuate a locking component of the engageable locking mechanism in a manner that engages the locking component with a particular ring gear, of a plurality of ring gears of the gear system.

11. The method of claim 10, wherein the engageable locking mechanism is engaged at a first time; the method further comprising:
 receiving new sensor data;
 determining whether the one or more conditions are satisfied based on the new sensor data;
 providing a second signal to the actuator component to cause the actuator component to actuate the locking component of the engageable locking mechanism in a manner that disengages the locking component with the particular ring gear at a second time; and
 providing a third signal to another actuator component of another engageable locking mechanism to cause the other actuator component to actuate another locking component of the other engageable locking mechanism in a manner that engages the other locking component with a particular carrier, of a plurality of carriers of the gear system.

12. The method of claim 8, wherein causing the set of engageable locking mechanisms to be configured with the selected lock configuration comprises:
 providing a signal to an actuator component of an engageable locking mechanism to cause the actuator component to actuate a locking component of the engageable locking mechanism in a manner that engages the locking component with a particular carrier, of a plurality of carriers of the gear system.

13. The method of claim 12, wherein the engageable locking mechanism is engaged at a first time; the method further comprising:
 receiving new sensor data;
 determining whether the one or more conditions are satisfied based on the new sensor data;
 providing a second signal to the actuator component to cause the actuator component to actuate the locking component of the engageable locking mechanism in a manner that disengages the locking component with the particular carrier at a second time; and
 providing a third signal to another actuator component of another engageable locking mechanism to cause the other actuator component to actuate another locking component of the other engageable locking mechanism in a manner that engages the other locking component with a particular ring gear, of a plurality of ring gears of the gear system.

14. A gear control system for controlling output torque provided to axles of a vehicle, comprising:
 a gear system, comprising:
 a first planetary gear set comprising at least a first sun gear that is in mechanical communication with a first input shaft of a first motor, the first sun gear being is radially disposed about a first axis, a first ring gear circumferentially disposed around the first sun gear, and a first carrier that is coupled to the first sun gear and a first axle;
 a second planetary gear set comprising at least a second sun gear that is radially disposed about a second axis that is offset from and parallel to the first axis, a second ring gear circumferentially disposed around the second sun gear, and a second carrier that is coupled to the second sun gear and a second axle; and
 a set of engageable locking mechanisms that are selectively configured to engage or disengage based on a trigger condition being satisfied, the set of engageable locking mechanisms including at least one of: a first engageable locking mechanism that is engageable with the first planetary gear set, or a second engageable locking mechanism that is engageable with the second planetary gear set;

a processor; and a memory that includes instructions that, when executed by the processor, cause the processor to:
receive sensor data from sensors associated with the vehicle;
determine whether one or more conditions are satisfied by comparing the sensor data and corresponding threshold data;
select, based on determining whether the one or more conditions are satisfied, a lock configuration, of a set of lock configurations, for a set of engageable locking mechanisms of the gear system; and
cause, using a signal indicative of the selected lock configuration, the set of engageable locking mechanisms to be configured with the selected lock configuration.

15. The gear control system of claim 14, wherein trigger condition being satisfied causes an engageable locking mechanism corresponding to a particular planetary gear set to engage with a ring gear of the particular planetary gear set to prevent ring gear rotation in a manner that allows the output torque of the gear system to be distributed between the first axle and the second axle.

16. The gear control system of claim 15, wherein the engageable locking mechanism corresponding to the particular planetary gear set is engaged at a first time; wherein another trigger condition being satisfied causes the engageable locking mechanism to disengage with the ring gear of the corresponding planetary gear set at a second time to allow ring gear rotation, and wherein the other signal further causes another engageable locking mechanism, that corresponds to another planetary gear set that is different than the particular planetary gear set, to engage with a carrier of the other planetary gear set to prevent carrier rotation in a manner that allows the output torque of the gear system to be provided to a particular axle that is not connected to the carrier to which the other engageable locking mechanism is engaged.

17. The gear control system of claim 14, wherein the trigger condition being satisfied causes an engageable locking mechanism corresponding to a particular planetary gear set to engage with a carrier of the particular planetary gear set to prevent carrier rotation in a manner that allows the output torque of the gear system to be provided to a particular axle that is not connected to the carrier to which the engageable locking mechanism has engaged.

18. The gear control system of claim 17, wherein the engageable locking mechanism is engaged at a first time, wherein another trigger condition being satisfied causes the engageable locking mechanism to disengage with the carrier at a second time to allow carrier rotation, and wherein the other signal further causes another engageable locking mechanism, that corresponds to a different planetary gear set than the particular planetary gear set, to engage with a ring gear of the other planetary gear set to prevent ring gear rotation in a manner that allows the output torque of the gear system to be distributed between the first axle and the second axle.

19. The gear control system of claim 14, wherein the set of locking mechanisms include at least one of:
a friction break, or
a pin.

20. The gear control system of claim 14, wherein the first carrier and the second carrier each include one or more respective carrier gears with heads that are conically shaped and include external teeth, and wherein the external teeth are engaged with corresponding external teeth of one or more respective axle gears at an angle that is within a threshold quantity of degrees of a ninety degree angle.

* * * * *